(12) United States Patent
Stamm

(10) Patent No.: US 6,924,046 B2
(45) Date of Patent: Aug. 2, 2005

(54) RHENIUM-CONTAINING PROTECTIVE LAYER FOR PROTECTING A COMPONENT AGAINST CORROSION AND OXIDATION AT HIGH TEMPERATURES

(75) Inventor: Werner Stamm, Mülheim (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/701,837

(22) Filed: Nov. 5, 2003

(65) Prior Publication Data

US 2005/0064229 A1 Mar. 24, 2005

Related U.S. Application Data

(63) Continuation-in-part of application No. 10/279,580, filed on Oct. 24, 2002, now abandoned.

(30) Foreign Application Priority Data

Oct. 24, 2001 (EP) .............................................. 01125260

(51) Int. Cl.$^7$ .......................... B32B 15/01; C22C 19/00
(52) U.S. Cl. ....................... 428/678; 428/680; 428/686; 148/408; 148/409; 148/410; 148/425; 148/426; 148/428; 420/436; 420/437; 420/443; 420/445
(58) Field of Search ................................ 428/678, 680, 428/686; 148/408, 409, 410, 425, 426, 428; 420/436, 437, 443, 445

(56) References Cited

U.S. PATENT DOCUMENTS

| 4,005,989 A | 2/1977 | Preston |
| 4,034,142 A | 7/1977 | Hecht |
| 4,743,462 A | 5/1988 | Radzavich et al. |
| 5,106,266 A | 4/1992 | Borns et al. |
| 5,154,885 A | 10/1992 | Czech et al. |
| 5,268,238 A | 12/1993 | Czech et al. |
| 5,273,712 A | 12/1993 | Czech et al. |
| 5,401,130 A | 3/1995 | Chiu et al. |
| 5,455,119 A | 10/1995 | Taylor et al. |

FOREIGN PATENT DOCUMENTS

| DE | 694 01 260 T2 | 5/1995 |
| EP | 0 194 392 A1 | 9/1986 |
| EP | 0 253 754 A1 | 1/1988 |
| EP | 0 412 397 A1 | 2/1991 |
| EP | 0 652 299 B1 | 5/1995 |
| EP | 1 082 216 B1 | 3/2001 |
| WO | WO 91/01433 | 2/1991 |
| WO | WO 91/02108 | 2/1991 |
| WO | WO 99/55527 | 11/1999 |
| WO | WO 01/09403 A1 | 2/2001 |
| WO | WO 01/72455 A1 | 10/2001 |

OTHER PUBLICATIONS

Anton, R. et al.: "Degradation of Advanced MCrAlY Coatings by Oxidation and Interdiffusion", Trans Tech Publications, Switzerland, vol. 369–372, 2001, pp. 719, 721, 723, and 725 (no month given).

Czech, N. et al.: "Improvement of MCrAlY Coatings by Addition of Rhenium", Surface and Coatings Technology, 68/69, Elsevier Science S.A., 1994, pp. 17–21 (no month given).

Beele, W. et al.: "Long–term Oxidation Tests on a Re–containing MCrAlY Coating", Surface and Coatings Technology, 94–95, Elsevier Science, S.A., 1997, pp. 41–45 (no month given).

Primary Examiner—Robert R. Koehler
(74) Attorney, Agent, or Firm—Laurence A. Greenberg; Werner H. Stemer; Gregory L. Mayback

(57) ABSTRACT

A protective layer has the composition 0.5 to 2% of rhenium, 15 to 21% of chromium, 9 to 11.5% of aluminum, 0.05 to 0.7% of yttrium and/or at least one equivalent metal from the group consisting of scandium and the rare earths, 0 to 1% of ruthenium, remainder cobalt and/or nickel and production-related impurities, and is scarcely subject to any embrittlement from Cr/Re precipitations.

6 Claims, No Drawings

RHENIUM-CONTAINING PROTECTIVE LAYER FOR PROTECTING A COMPONENT AGAINST CORROSION AND OXIDATION AT HIGH TEMPERATURES

CROSS-REFERENCE TO RELATED APPLICATION

This is a continuation-in-part of U.S. application Ser. No. 10/279,580, filed Oct. 24, 2002 now Abn.

BACKGROUND OF THE INVENTION

Field of the Invention

The invention relates to a rhenium-containing protective layer for protecting a component against corrosion and oxidation at high temperatures. The component, in particular a component of a gas turbine, is exposed to a flue gas or the like at a high temperature.

The invention relates in particular to a protective layer for a component that contains a nickel-base or cobalt-base superalloy.

Protective layers for metallic components that are intended to increase the resistance to corrosion and/or oxidation of the components are known from the prior art. Most of the protective layers are known under the collective name MCrAlY, where M represents at least one of the elements from the group containing iron, cobalt and nickel, and further essential constituents are chromium, aluminum and yttrium. The latter may also be completely or partially replaced by an equivalent element from scandium or the rare earths.

Typical coatings of this type are known from U.S. Pat. Nos. 4,005,989 and 4,034,142. Moreover, it is known from the latter patent that an additional silicon fraction can further improve the properties of protective layers of the type mentioned above.

Furthermore, Published, European Patent Application EP 0 194 392 A discloses numerous specific compositions for protective layers of the above type with the addition of further elements for various applications. The element rhenium added in amounts of up to 10% by weight is mentioned as well as many other elements that can be added if desired. However, on account of relatively unspecific, wide ranges for possible additions, none of the protective layers described is qualified for particular conditions, such as for example those that occur at rotor blades and guide vanes of gas turbines with high entry temperatures which have to be operated for prolonged periods.

Protective layers which contain rhenium are also known from U.S. Pat. No. 5,154,885, Published, European Patent Application EP 0 412 397 A (corresponding to U.S. Pat. Nos. 5,273,712, 5,154,885, and 5,268,238), German Patent DE 694 01 260 T2 (corresponding to U.S. Pat. No. 5,455,119) and International Patent Disclosure WO 91/02108 A1 (corresponding to U.S. Pat. No. 5,401,130). The disclosures that can be found in these documents as a whole are incorporated in its entirety in the present application.

Ways of applying a protective layer to a component which is to be subject to high thermal loads in a gas turbine are to be found in Published, European Patent Application EP 0 253 754 A1 (corresponding to U.S. Pat. No. 4,743,462).

Efforts to increase the entry temperatures both in stationary gas turbines and in aircraft engines are of considerable importance in the specialist field of gas turbines, since the entry temperatures are important variables in determining the thermodynamic efficiencies which can be achieved by gas turbines. The use of specially developed alloys as base materials for components which are to be subject to high thermal loads, such as guide vanes and rotor blades, and in particular the use of single-crystal superalloys, makes it possible to have entry temperatures of well above 1000° C. By now, the prior art allows entry temperatures of 950° C. and above in stationary gas turbines and 1100° C. and above in gas turbines of aircraft engines.

Examples of the construction of a turbine blade or vane with a single-crystal substrate, which for its part may be of complex structure, are to be found in International patent Disclosure WO 91/01433 A1 (corresponding to U.S. Pat. No. 5,106,266).

While the physical load-bearing capacity of the by now highly developed base materials for the highly loaded components are substantially problem-free with regard to possible further increases in the entry temperatures, to achieve a sufficient resistance to oxidation and corrosion it is necessary to have recourse to protective layers. In addition to the sufficient chemical resistance to a protective layer to the attacks which are to be expected from flue gases at temperatures of the order of magnitude of 1000° C., a protective layer must also have sufficiently good mechanical properties, not least with regard to the mechanical interaction between the protective layer and the base material. In particular, the protective layer must be sufficiently ductile to be able to follow any deformation of the base material without cracking, since this would create points of attack for oxidation and corrosion. In this context, the problem typically arises that an increase in the levels of elements such as aluminum and chromium, which are to be able to improve the resistance of a protective layer to oxidation and corrosion, leads to a deterioration in the ductility of the protective layer, so that there will be an expectation of mechanical failure, in particular of the formation of cracks, in the event of a mechanical load which customarily occurs in a gas turbine. Examples of the way in which the ductility of the protective layer is reduced by the elements chromium and aluminum are known from the prior art.

International Patent Disclosure WO 01/09403 A1 discloses a superalloy for a substrate, which likewise contains rhenium. The document describes that the intermetallic phases formed by rhenium reduce the long-term stability of the superalloy. The problem can be alleviated by the addition of ruthenium.

SUMMARY OF THE INVENTION

It is accordingly an object of the invention to provide a rhenium-containing protective layer for protecting a component against corrosion and oxidation at high temperatures which overcome the above-mentioned disadvantages of the prior art devices of this general type, which has a good high-temperature resistance to corrosion and oxidation, a good long-term stability and, moreover, is particularly suitable for a mechanical load which is to be expected in particular in a gas turbine at a high temperature.

The invention is based on the discovery that the prior art protective layer has brittle chromium-rhenium precipitations in the layer and in the transition region between the protective layer and the base material. The brittle phases, increasing amounts of which are formed with time and temperature in use, lead to pronounced longitudinal cracks in the layer and in the layer-base material interface during operation, ultimately leading to the layer becoming detached. The interaction with carbon, which can diffuse out of the base material into the layer or diffuses into the layer through the surface during a heat treatment in the furnace, additionally increases the brittleness of the Cr-Re precipitations. The likelihood of cracks being formed is increased still further by oxidation of the chromium-rhenium phases.

To achieve the object, the invention describes a protective layer for protecting a component against corrosion and oxidation at a high temperature that is substantially composed of the following elements (contents given in percent by weight):

0.5 to 2% of rhenium;
15 to 21% of chromium;
9 to 11.5% of aluminum;
0.05 to 0.7% of yttrium and/or at least one equivalent metal from the group consisting of scandium and the rare earths;
a remainder being cobalt and/or nickel; and
production-related impurities.

In addition, the protective layer can include 0 to 1% by weight of ruthenium.

In accordance with a further object of the invention, the amount of cobalt is from 24 to 26 wt %. Preferably, the amount of cobalt is approximately 25 percent.

The advantageous effect of the element rhenium is exploited to prevent the formation of brittle phases.

It should be noted that the levels of the individual elements are particularly well matched with regard to their affects that originate from the element rhenium. If the levels of the elements are such that no chromium-rhenium precipitations are formed, there are advantageously no brittle phases formed during use of the protective layer, so that the service life is improved and lengthened. This is achieved not only by lowering the chromium content but also by taking account of the influence of aluminum on the phase formation by the reduction in the aluminum content.

The protective layer, with a good resistance to corrosion, also has a particularly good resistance to oxidation and is also distinguished by particularly good ductility properties, making it particularly well qualified for use in a gas turbine in the event of a further increase in the entry temperature. During operation, there is scarcely any embrittlement, since the layer has scarcely any chromium-rhenium precipitations that become brittle during use. The superalloy has no chromium-rhenium precipitations, or at most 6% by volume of chromium-rhenium precipitations.

It is advantageous for the rhenium content to be set at approximately 1.5% wt, the chromium content to be set at approximately 17% wt, the aluminum content to be set at approximately 10% wt, and the yttrium content to be set at approximately 0.3% wt. Certain fluctuations will occur as a result of large-scale industrial production.

The invention relates to a component, in particular a component of a gas turbine, which is to be protected against corrosion and oxidation at high temperatures by a protective layer of the type described above.

The protective layer described also acts as a bonding layer to a superalloy. Further layers, in particular ceramic thermal barrier coatings, can be applied to the layer.

In the component, the protective layer is advantageously applied to a substrate containing a nickel-base or cobalt-base superalloy. In particular, the following composition is suitable for the substrate (information in percent by weight):

0.03 to 0.5% of carbon;
18 to 19% of chromium;
12 to 15% of cobalt;
3 to 6% of molybdenum;
1 to 1.5% of tungsten;
2 to 2.5% of aluminum;
3 to 5% of titanium; and
optionally small amounts of tantalum, niobium, boron and/or zirconium, remainder nickel.

Such materials are known as forging alloys under the names Udimet 520 and Udimet 720.

Alternatively, the following composition may be suitable for the substrate of the component (details in percent by weight):

0.1 to 0.15% of carbon;
18 to 22% of chromium;
18 to 19% of cobalt;
0 to 2% of tungsten;
0 to 4% of molybdenum;
0 to 1.5% of tantalum;
0 to 1% of niobium;
1 to 3% of aluminum;
2 to 4% of titanium;
0 to 0.75% of hafnium; and
optionally small amounts of boron and/or zirconium, remainder nickel.

Compositions of this type are known as casting alloys under the names GT222, IN939, IN6203 and Udimet 500.

A further alternative for the substrate of the component is the following composition (details in percent by weight):

0.07 to 0.1% of cobalt;
12 to 16% of chromium;
8 to 10% of cobalt;
1.5 to 2% of molybdenum;
2.5 to 4% of tungsten;
1.5 to 5% of tantalum;
0 to 1% of niobium;
3 to 4% of aluminum;
3.5 to 5% of titanium;
0 to 0.1% of zirconium;
0 to 1% of hafnium; and
optionally a small amount of boron, remainder nickel.

Compositions of this type are known as casting alloys PWA1483SX, IN738LC, GTD111, IN792CC and IN792DS; the material IN738LC is to be considered particularly preferred.

The following composition is considered a further alternative for the substrate of the component (details in percent by weight):

approximately 0.25% of carbon;
24 to 30% of chromium;
10 to 11% of nickel;
7 to 8% of tungsten;
0 to 4% of tantalum;
0 to 0.3% of aluminum;
0 to 0.3% of titanium;
0 to 0.6% of zirconium; and
optionally a small amount of boron, remainder cobalt.

Such compositions are known as casting alloys under the names FSX414, X45, ECY768 and MAR-M-509.

The thickness of the protective layer on the component is preferably between approximately 100 μm and 300 μm.

The protective layer is particularly suitable for protecting a component against corrosion and oxidation while the component is being acted on with a flue gas at a material temperature of around 950° C., and in aircraft turbines even of around 1100° C.

The protective layer according to the invention is therefore particularly qualified for protecting a component of a gas turbine, in particular a guide vane, rotor blade or other component that is acted on by hot gas upstream of or in the turbine of the gas turbine.

I claim:

1. A single protective layer for protecting a component against corrosion and oxidation at high temperatures, essentially consisting of:
   0.5 to 2% wt of rhenium;
   15 to 21% wt of chromium;
   9 to 11.5% wt of aluminum;
   0.05 to 0.7% by weight of an element selected from the group consisting of yttrium, scandium and rare earths;
   0 to 1% wt of ruthenium;
   a remainder selected from the group consisting of cobalt and nickel; and
   production-related impurities.

2. The protective layer according to claim 1, wherein:
   the rhenium content is 1.5% wt;
   the chromium content is 17% wt;
   the aluminum content is 10% by wt; and
   a content of the element selected from the group consisting of yttrium, scandium, and rare earths is 0.3% wt, it being possible for contents listed to fluctuate in a manner customary in industrial production.

3. The protective layer according to claim 1, wherein the protective layer contains so few chromium-rhenium precipitations that there is no significant embrittlement of the protective layer.

4. The protective layer according to claim 3, wherein a volume of the chromium-rhenium precipitation is at most 6% by volume.

5. The protective layer according to claim 1, wherein a weight percentage of said cobalt is from 24 to 26.

6. The protective layer according to claim 5, wherein said weight percentage of said cobalt is 25.

* * * * *